US011195710B2

(12) United States Patent
Park et al.

(10) Patent No.: US 11,195,710 B2
(45) Date of Patent: Dec. 7, 2021

(54) HYBRID MASS SPECTROMETRIC SYSTEM

(71) Applicant: Bruker Daltonik GmbH, Bremen (DE)

(72) Inventors: Melvin Andrew Park, Billerica, MA (US); Mark Ridgeway, Stow, MA (US); Craig Whitehouse, Branford, CT (US); Andreas Brekenfeld, Bremen (DE)

(*) Notice: Subject to any disclaimer, the term of this patent is extended or adjusted under 35 U.S.C. 154(b) by 0 days.

(21) Appl. No.: 16/881,534

(22) Filed: May 22, 2020

(65) Prior Publication Data

US 2020/0381241 A1   Dec. 3, 2020

Related U.S. Application Data

(60) Provisional application No. 62/855,093, filed on May 31, 2019.

(51) Int. Cl.
| | | |
|---|---|---|
| *H01J 49/40* | (2006.01) | |
| *H01J 49/10* | (2006.01) | |
| *G01N 27/622* | (2021.01) | |
| *H01J 49/06* | (2006.01) | |
| *H01J 49/24* | (2006.01) | |
| *H01J 49/04* | (2006.01) | |
| *H01J 49/42* | (2006.01) | |

(52) U.S. Cl.
CPC ............ *H01J 49/40* (2013.01); *G01N 27/622* (2013.01); *H01J 49/0495* (2013.01); *H01J 49/063* (2013.01); *H01J 49/065* (2013.01); *H01J 49/066* (2013.01); *H01J 49/10* (2013.01); *H01J 49/24* (2013.01); *H01J 49/4235* (2013.01)

(58) Field of Classification Search
CPC .......... H01J 49/40; H01J 49/10; H01J 49/063; H01J 49/24; H01J 49/0495; H01J 49/066; H01J 49/004; H01J 49/167; H01J 49/065; H01J 49/4235; G01N 27/622; G01N 27/623
USPC ......................................... 250/286, 287, 290
See application file for complete search history.

(56) References Cited

U.S. PATENT DOCUMENTS

| | | | |
|---|---|---|---|
| 6,107,628 A | 8/2000 | Smith | |
| 6,630,662 B1 | 10/2003 | Loboda | |
| 7,671,344 B2 | 3/2010 | Tang | |
| 7,838,826 B1 | 11/2010 | Park | |
| 9,683,964 B2 | 6/2017 | Park | |
| 10,241,079 B2 | 3/2019 | Betz et al. | |
| 2004/0195503 A1 | 10/2004 | Kim et al. | |

(Continued)

FOREIGN PATENT DOCUMENTS

| | | |
|---|---|---|
| WO | 2013067366 A2 | 5/2013 |
| WO | 2014021960 A1 | 2/2014 |

OTHER PUBLICATIONS

Svartsburg, A. A., et al., "Fundamentals of Traveling Wave Ion Mobility Spectrometry", Anal. Chem., 2008, 80(24), pp. 9689-9699.

(Continued)

*Primary Examiner* — Kiet T Nguyen
(74) *Attorney, Agent, or Firm* — Benoit & Côté Inc.

(57) ABSTRACT

The invention relates to hybrid IMS/MS systems and provides hybrid IMS/MS system comprising an RF funnel, an ion mobility analyzer and a mass analyzer wherein the RF funnel is arranged non-collinearly to the ion mobility analyzer, preferably a TIMS analyzer (TIMS=trapped ion mobility spectrometry).

25 Claims, 11 Drawing Sheets

(56) References Cited

U.S. PATENT DOCUMENTS

| | | | |
|---|---|---|---|
| 2006/0108520 A1* | 5/2006 | Park et al. | H01J 49/00 |
| | | | 250/286 |
| 2008/0156978 A1 | 7/2008 | Shvartsburg et al. | |
| 2011/0062322 A1 | 3/2011 | Franzen | |
| 2014/0284472 A1* | 9/2014 | Verenchikov | G01N 27/62 |
| | | | 250/286 |
| 2014/0353493 A1 | 12/2014 | Mordehai | |
| 2015/0233866 A1* | 8/2015 | Verenchikov | G01N 27/62 |
| | | | 250/286 |
| 2017/0315092 A1* | 11/2017 | Silveira | G01N 27/62 |
| | | | 250/286 |
| 2017/0350860 A1 | 12/2017 | Rather et al. | |
| 2018/0038831 A1 | 2/2018 | Ibrahim et al. | |
| 2019/0164737 A1 | 5/2019 | Gillig et al. | |
| 2019/0265195 A1* | 8/2019 | Park et al. | G01N 27/62 |
| | | | 250/286 |

OTHER PUBLICATIONS

Michelmann, K., et al., "Fundamentals of Trapped Ion Mobility Spectrometry", J. Am. Soc. Mass Spectrom., 2015, 26, pp. 14-24.

Young et al., "Water Cluster Ions: Rates of Formation and Decomposition of Hydrates of the Hydronium Ion", J. Chem. Phys., 1970, 53, pp. 4295-4302.

Hoaglund et al., "Three-Dimensional Ion Mobility/TOFMS Analysis of Electrosprayed Biomolecules", Anal. Chem., 1998, 70, pp. 2236-2242.

Koeniger, et al., "An IMS-IMS Analogue of MS-MS", Anal. Chem. 2006, 78, pp. 4161-4174.

* cited by examiner

HYBRID MASS SPECTROMETRIC SYSTEM

BACKGROUND OF THE INVENTION

Field of the Invention

The invention relates to hybrid mass spectrometric systems in which ion mobility spectrometry (IMS) is coupled with mass spectrometry (MS), in particular with tandem mass spectrometry (tandem MS), and methods for operating the hybrid mass spectrometric systems.

Description of the Related Art

Ion mobility spectrometry (IMS) is an analytical technique that is used to investigate the mobility of ions in a buffer gas and to separate them according to their mobility.

An inherent feature of ion mobility spectrometry is that the mobility of ions in a buffer gas depends on molecular geometries of the ions such that it is often possible to resolve and thus separate isomers or conformers that cannot be resolved by mass spectrometry. Many applications also take advantage of the ability to determine the cross section of an analyte ion from its measured mobility. Knowledge of cross sections has proven to be significant in many areas including identifying compound class and detailed structure, in particular in the field of structural biology.

IMS analyzers exist based on various principles.

A drift type IMS analyzer measures how long an ion takes to traverse a gas filled drift tube when a uniform stationary electric DC field is acting on the ion. In specified intervals, a pulse of ions is injected into the drift tube. For injecting the ion pulse, an ion gate such as a Bradbury-Nielsen gate or a Tyndall gate is used. Once in the drift tube, the ions are subjected to the uniform electric field ranging from a few volts per centimeter up to many hundreds of volts per centimeter. The electric field drives the ions through the drift tube, where they collide with the neutral atoms or molecules of the buffer gas and separate based on their ion mobility, towards an ion detector. Ions are recorded at the ion detector in order from the fastest (highest ion mobility) to the slowest (lowest ion mobility).

A travelling wave IMS analyzer (TWIMS) uses a non-uniform transient electric DC field. The non-uniform electric DC field is varied in time such that a travelling wave is created and moves through a drift region. A sequence of waves continually propagating through the drift tube propels ions, which are injected as a pulse of ions into the drift tube, towards an ion detector. The velocity of the ions species depends on mobility such that different ion species transit the drift tube in different drift times. A TWIMS analyzer is commonly operated at low pressures of around 20 Pa and uses an electric RF field for radially confining the ions. Regarding the theoretical basis of TWIMS, see the article "Fundamentals of Traveling Wave Ion Mobility Spectrometry" by Svartsburg et al. (Anal. Chem., 2008, 80(24), 9689-9699).

In trapped ion mobility spectrometry (TIMS), ions are at first trapped along a non-uniform electric DC field (electric field gradient, EFG) by a counteracting gas flow or along a uniform electric DC field by a counteracting gas flow which has a non-uniform axial velocity profile (gas velocity gradient). The trapped ions are at first separated in space in a TIMS analyzer according to mobility and subsequently eluted from the TIMS analyzer over time according to their mobility by adjusting one of the gas velocity and the height of the axial electric DC field (U.S. Pat. No. 6,630,662 B1 by Loboda; U.S. Pat. No. 7,838,826 B1 by Park). A TIMS analyzer is commonly operated in the low pressure range of 2 to 500 Pa and uses an electric RF field for radially confining the ions. Regarding the theoretical basis of TIMS, see the article "Fundamentals of Trapped Ion Mobility Spectrometry" by Michelmann et al. (J. Am. Soc. Mass Spectrom., 2015, 26, 14-24).

Several groups have coupled drift type IMS analyzers to mass analyzers (MS and tandem MS) and liquid chromatography (LC) instruments to characterize complex biological mixtures (Young et al., J. Chem. Phys., 1970, 53, 4295-4302; Hoaglund et al., Anal. Chem., 1998, 70, 2236). Later on, the Clemmer group developed a drift type IMS device for tandem IMS (Koeniger et al., Anal. Chem. 2006, 78, 4161). In this article, the authors describe that it is possible to disperse a mixture of precursor ions on the basis of different drift times in a first drift type IMS analyzer and select ions of specified mobility for collisional activation. The fragments, or new conformations, that are formed by the collisional activation are then separated in a second drift type IMS analyzer before further analysis by MS. This tandem IMS approach is analogous to the well-known tandem MS (also termed MS/MS and MS2) strategies, but the separations of the initial precursor and fragment ions are based on mobility rather than mass-to-charge (m/z) ratios.

There is still a need for hybrid mass spectrometric systems for coupling ion mobility spectrometry with (tandem) mass spectrometry which enable multiple operational modes, in particular with multiple ion sources, and the analysis of small sample quantities.

SUMMARY OF THE INVENTION

The invention provides a mass spectrometric system comprising an ion source, a first RF funnel, an ion mobility separator and a mass analyzer wherein the RF funnel is arranged non-collinearly to the ion mobility analyzer (separator). The non-collinear arrangement means that the angle between the axis of the first RF funnel and the axis of the ion mobility analyzer is substantially not zero. The angle between the axis of the first RF funnel and the axis of the ion mobility analyzer is greater than 10°, preferably greater than 45°, more preferably greater than 75°, in particular substantially 90° (orthogonal arrangement). The angle between the axis of the first RF funnel and the axis of the ion mobility analyzer can be more than 90°, e.g. more than 90° and less than 120°.

The mass analyzer is one of a time-of-flight analyzer, in particular with orthogonal ion injection, an electrostatic ion trap, an RF ion trap, an ion cyclotron frequency ion trap and a quadrupole mass filter. The mass spectrometric system can further comprise a mass filter and/or a fragmentation cell between the ion mobility analyzer and the mass analyzer. The ions can be fragmented by one of collision induced dissociation (CID), surface induced dissociation (SID), photo-dissociation (PD), electron capture dissociation (ECD), electron transfer dissociation (ETD), collisional activation after electron transfer dissociation (ETcD), activation concurrent with electron transfer dissociation (AI-ETD) and fragmentation by reactions with highly excited or radical neutral particles. The photo-dissociation preferably comprises infrared multiple photon-dissociation (IRMPD) or ultraviolet photo-dissociation (UVPD). The selected ions can be activated for example by multiple photon absorption or by collision induced activation in dipolar or rotational acting electric AC fields.

The mass spectrometric system preferably comprises a second RF funnel which is located at the entrance of the ion mobility analyzer and which is collinearly arranged to the ion mobility analyzer. The collinear arrangement means that the angle between the axis of the second RF funnel and the axis of the ion mobility analyzer is substantially zero. More preferably, the ion mobility analyzer is a TIMS analyzer (separator). The TIMS analyzer can comprise an electric DC field gradient (ramp) and a counteracting gas flow that drives ions against the electric DC field gradient such that ions are axially trapped in the RF ion guide. The direction of the gas flow can be directed upstream towards an ion source or downstream away from the ion source. Most preferably, the electric DC field gradient is the rising edge of an electric DC field barrier having an apex or a plateau whereas the counteracting gas flow drives the ions away from the ion source against the barrier. The TIMS analyzer can also comprise a gas flow with a velocity gradient and a counteraction (constant) electric DC field. The ions are radially confined by an electric RF field. The trapped ions are axially released from the ion guide according to their mobility by adjusting the electric DC field and/or the gas flow.

The first and second RF funnels can be dipolar RF funnels with apertured electrodes whose inner diameter decreases downstream along the axis of the RF funnel. Adjacent electrodes are supplied with RF potentials of different phases, preferably of opposite phase. Dipolar RF funnels are known from U.S. Pat. No. 6,107,628 by Smith et al. One or both RF funnels are preferably multipolar RF funnels, more preferably quadrupolar RF funnels, known from published U.S. Patent Application 2004/0195503 (Kim et. al). Each apertured electrode of a multipolar RF funnel comprises electrically isolated segments. Adjacent segments of a single electrode as well as adjacent segments of neighboring electrodes are supplied with RF potentials of different phases, preferably of opposite phase.

In a first embodiment, the first RF funnel and the ion mobility analyzer are located in two different vacuum chambers. The pressure in the vacuum chamber of the first RF funnel is preferably higher than the pressure in the vacuum chamber of the ion mobility analyzer. The pressure can, for example, be higher than a factor 2, 5, 10, 20 or 50. The pressure in the vacuum chamber of the first RF funnel can be equal or higher than 100 Pa, 200 Pa, 500 Pa, 750 Pa, 1000 Pa, 2000 Pa or 5000 Pa. The pressure can in particular be between 500 and 5000 Pa.

In a second embodiment, the mass spectrometric system further comprises an RF multipole which is located between the first RF funnel and the second RF funnel. The RF multipole can be collinearly arranged to the first RF funnel or tilted to the first RF funnel, e.g. by an angle of less than 20°. The RF multipole is most preferably linear (two-dimensional) and can be straight or bent. It can, for example, be constructed as an RF quadrupole, an RF hexapole, an RF octopole or an RF tunnel.

The RF multipole can, for example, be operated as one of a quadrupole mass filter, a mass-mobility quadrupole filter, an ion guide, a fragmentation cell, an activation cell and an ion trap.

For actively guiding ions through the RF multipole, the RF multipole can be segmented and electric DC potentials can be applied to the segments. Additional electrodes arranged at the front and back end of the RF multipole or the segments of the RF multipole can also be used to trap the ions inside the RF multipole by applying appropriate electric DC potentials. Ions can also be guided through the RF multipole by a gas flow which is generated by a pressure difference between the entrance and exit of the RF multipole.

For activating or fragmenting ions inside the RF multipole, ions can be accelerated into the RF multipole or between segments of the RF multipole and fragmented by collision induced dissociation (CID) or by surface induced dissociation (SID). The mass spectrometric system can further comprise a light source and optics for introducing photons generated by the light source into the RF multipole, preferably at the exit side of the RF multipole. The light source can be one of a laser, excimer lamp, a light emitting diode and a flashlight, and the photons generated by the light source can, for example, be one of vacuum ultraviolet photons, ultraviolet photons and infrared photons. While ions are trapped inside or guided through the RF multipole (flow through mode), they can be fragmented by photo-dissociation, in particular by ultraviolet photo-dissociation (UVPD), vacuum ultraviolet photo-dissociation (VUVPD) or by infrared multi-photon dissociation (IRMPD), or they can be activated by absorbing infrared photons.

For filtering ions inside the RF multipole, the RF multipole is preferably a RF quadrupole. The RF quadrupole can, for example, be operated near a border of stability which can be adjusted by a quadrupolar DC potential and the amplitude or frequency of the quadrupolar RF potential. The RF quadrupole can be operated at elevated pressure above 100 Pa such that ions are filtered according to a combination of their mass and mobility.

The mass spectrometric system can further comprise an additional TIMS analyzer (separator) which is located between the first RF funnel and the RF multipole and which is preferably arranged collinearly to the first RF funnel. At least one of the TIMS analyzers preferably comprises an accumulation region for trapping and a mobility separation region, wherein ions are preferably spatially separated according to mobility in the accumulation region. A TIMS analyzer (separator) with parallel accumulation is disclosed in U.S. Pat. No. 9,683,964 (Park et. al). The mass spectrometric system can further comprise an ion gate between both TIMS analyzers, which is preferably located at or near the exit of the additional TIMS analyzer. The ion gate can be used to select one or more ion species after being separated in the additional (upstream) TIMS analyzer for a selective transfer to the (downstream) TIMS analyzer as described in U.S. Pat. No. 10,241,079 (Betz et. al) or for tandem IMS.

The first RF funnel and the additional TIMS analyzer are preferably located in a first vacuum chamber and the (downstream) TIMS analyzer is preferably located in a second vacuum chamber. The RF multipole can be completely located in the first or second vacuum chamber or can transition from the first into the second vacuum chamber. The pressure in the first vacuum chamber can be equal or higher than 100 Pa, 200 Pa, 500 Pa, 750 Pa, 1000 Pa, 2000 Pa or 5000 Pa, and is in particular between 500 and 5000 Pa.

The RF multipole can also be located in an additional vacuum chamber which is located between the first and second vacuum chamber and separated from these chambers by differential pumping stages wherein the pressure in the additional vacuum chamber is preferably lower than the pressure in the first and second vacuum chambers. The second vacuum chamber can comprise a gas inlet for providing gas to the second vacuum chamber. Preferably, the RF multipole is an RF quadrupole operated as a mass filter at a pressure below 100 Pa, more preferably below 10 Pa, even more preferably below 1 Pa.

In a third embodiment, the mass spectrometric system comprises a TIMS analyzer and an additional upstream TIMS analyzer without an RF multipole located between them. The additional TIMS analyzer is located between the first RF funnel and the TIMS analyzer and is preferably arranged collinearly to the first RF funnel.

At least one of the TIMS analyzers preferably comprises an accumulation region for trapping and a mobility separation region, wherein ions are preferably spatially separated according to mobility in the accumulation region. A TIMS analyzer (separator) with parallel accumulation is disclosed in U.S. Pat. No. 9,683,964 (Park et. al). An ion gate can be located between both TIMS analyzers, and is preferably located at or near the exit of the additional upstream TIMS analyzer. The ion gate can be used to select one or more ion species after being separated in the additional (upstream) TIMS analyzer for a selective transfer to the (downstream) TIMS analyzer as described in U.S. Pat. No. 10,241,079 (Betz et. al) or for tandem IMS.

The first RF funnel and the additional TIMS analyzer are preferably located in a first vacuum chamber and the downstream TIMS analyzer is located in a second vacuum chamber. The pressure in the first vacuum chamber is preferably higher than the pressure in the second vacuum chamber wherein the pressure in the first vacuum chamber can be equal to or higher than 100 Pa, 200 Pa, 500 Pa, 750 Pa, 1000 Pa, 2000 Pa or 5000 Pa, and can in particular be between 500 and 5000 Pa.

In a fourth embodiment, the mass spectrometric system can comprise more than one ion source. One of the ion sources can be an atmospheric pressure ion source which is coupled to a vacuum chamber of the first RF funnel by one of a single transfer capillary, multiple transfer capillaries, a multi-bore transfer capillary, a single aperture and multiple apertures. One of the ion sources can be a sub-ambient pressure ion source which is located either upstream of the first RF funnel and inside the vacuum chamber of the first RF funnel or between the first RF funnel and the ion mobility analyzer and inside the vacuum chamber of the ion mobility analyzer. The ions can be generated using one of spray ionization (e.g. electrospray (ESI) or thermal spray), desorption ionization (e.g. matrix-assisted laser/desorption ionization (MALDI) or secondary ionization), chemical ionization (CI), photo-ionization (PI), electron impact ionization (EI), and gas-discharge ionization.

The mass spectrometric systems according to the present invention have multiple advantages:

A first advantage is that the non-collinear arrangement enables that a first vacuum chamber can be operated at an elevated pressure such that the gas flow from the first vacuum chamber into a downstream vacuum chamber at lower pressure does not substantially influence the gas dynamic of the ion mobility analyzer in the downstream vacuum chamber. The decoupling of the gas dynamics is especially important in case of a TIMS analyzer in the downstream vacuum chamber due to the gas flow needed for the TIMS analyzer.

The elevated pressure in the first vacuum chamber enables an integration of a sub-ambient electrospray ion source known for example from U.S. Pat. No. 7,671,344 (Tang et al.) which is preferably operated at 500 to 2000 Pa. The elevated pressure in the first vacuum chamber enables that an atmospheric electrospray ion source can be coupled to the first chamber using a transfer capillary which has a higher volumetric flow rate than commonly used transfer capillaries because the gas load can be pumped away more efficiently at the elevated pressure, in particular at a pressure above 1000 Pa. The commonly used transfer capillaries usually end up in a vacuum stage at a pressure of less than 300 Pa and have an inner diameter of less than 1 mm, whereas wide bore capillaries with the higher volumetric flow rate can have an inner diameter of 1 mm or more. The sub-ambient electrospray ion source as well as the wide bore atmospheric pressure ion source are preferably used for analyzing low sample amounts, in particular in proteomics, more particular in single cell proteomics.

The elevated pressure in the first vacuum chamber further enables an increased mobility resolution for an upstream TIMS analyzer located in the first vacuum chamber because the mobility resolution of a TIMS analyzer scales by $K^{-3/4}$ and therefore by $p^{3/4}$ wherein K is the mobility of the ions at pressure p. Furthermore, an elevated pressure shifts the operating point of the upstream TIMS analyzer away from the minimum of the Paschen curve and allows higher electric RF voltages for an enhanced radial confinement and higher electric DC fields of the TIMS analyzer.

A second advantage is that the non-collinear arrangement of an RF multipole to a downstream ion mobility analyzer, in particular to an RF funnel of a downstream TIMS analyzer, enables an easy way to introduce photons at the exit end of the RF multipole into the RF multipole for photon-induced fragmentation or activation.

A third advantage is that the mass spectrometric systems according to the present invention enable a plurality of operational modes:

MS (without IMS)
Tandem MS (without IMS)
IMS/(tandem)MS
IMS with selection/IMS/(tandem)MS
Tandem IMS with fragmentation/activation/(tandem)MS
IMS/mass-mobility or mass filtering/IMS/(tandem)MS
IMS with mobility selection/mass-mobility or mass filtering/IMS/(tandem)MS

DETAILED DESCRIPTION

While the invention is shown and described with reference to a number of different embodiments thereof, it will be recognized by those skilled in the art that combinations of examples and embodiments and changes in form and detail may be made herein without departing from the scope of the invention as defined by the appended claims. The invention can be better understood by referring to the following figures. The elements in the figures are not necessarily to scale, emphasis instead being placed upon illustrating the principles of the invention (often schematically). The elements being identical or having equivalent function are labeled with identical reference signs in different figures.

Figure 1A:
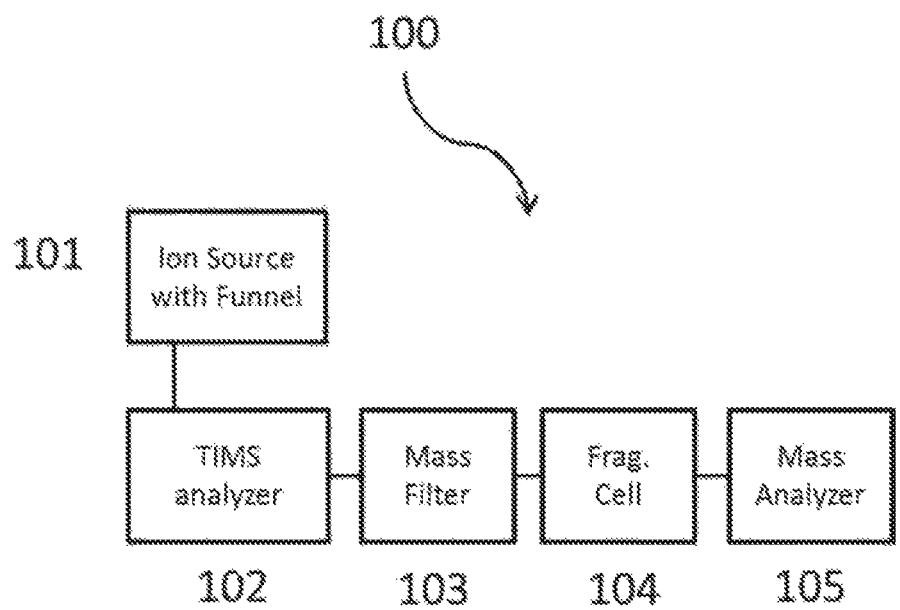
FIG. 1A shows a schematic of a first exemplary mass spectrometric system (100) which comprises an ion source (101) with an RF funnel, a TIMS analyzer (102), a mass filter (103), a fragmentation cell (104) and a mass analyzer (105).

FIG. 1A shows a schematic of a first example of a mass spectrometric system according to the present invention. The mass spectrometric system (100) comprises an ion source (101) with an RF funnel, a TIMS analyzer (102), a mass filter (103), a fragmentation cell (104) and a mass analyzer (105). The mass analyzer (105) is preferably a time-of-flight analyzer with orthogonal ion injection (OTOF-MS).

Figure 1B:
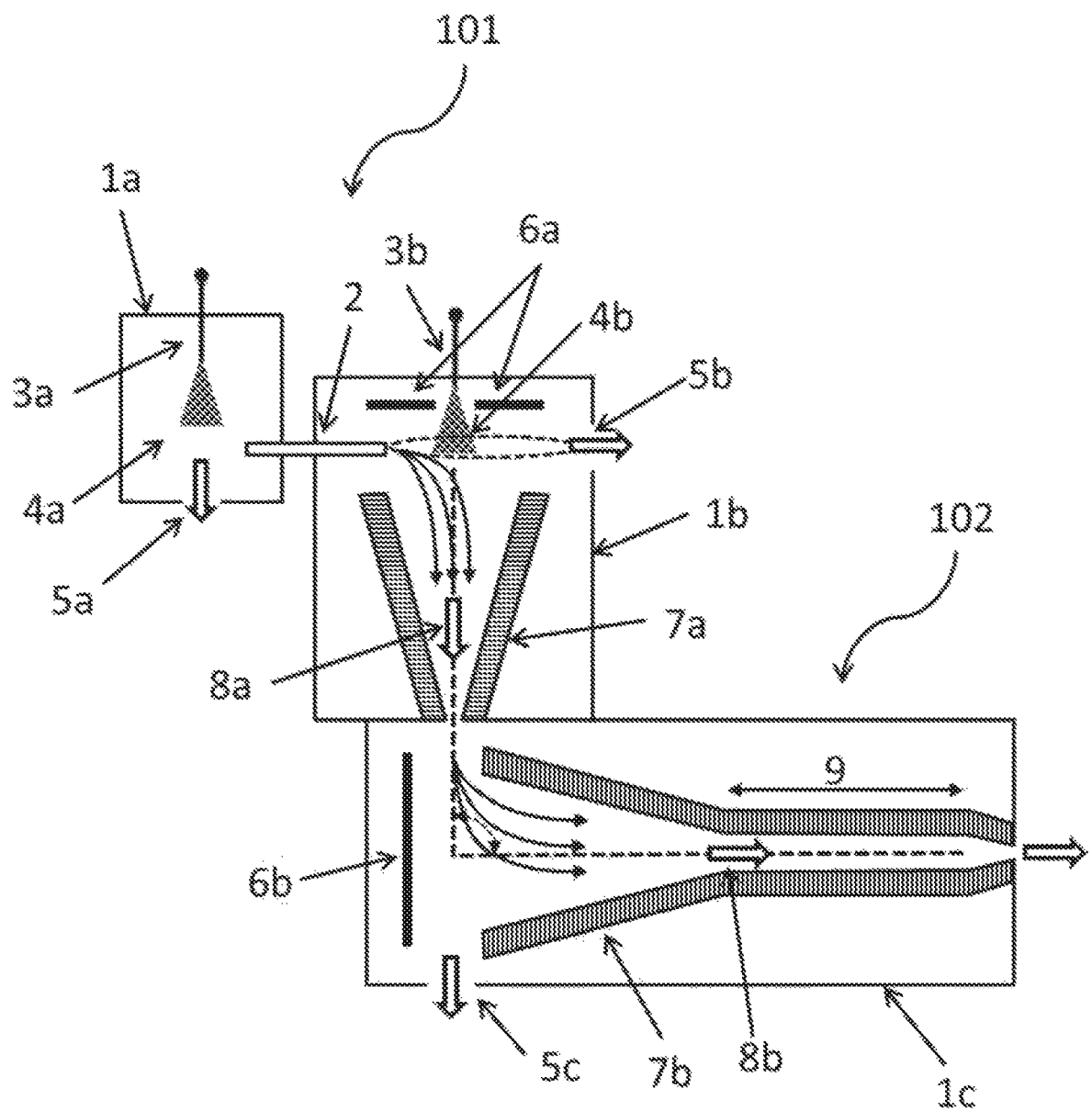
FIG. 1B shows the ion source (101) with an RF funnel and the TIMS analyzer (102) of the mass spectrometric system (100) in more detail.

FIG. 1B shows the ion source (101) with RF funnel and the TIMS analyzer (102) in more detail. The ion source with RF funnel (101) comprises two chambers (1a, 1b).

The chamber (1a) is held at atmospheric pressure and incorporates an electrospray ion source (spray emitter (3a), spray plume (4a)). Ions from the spray plume (4a) are introduced via a transfer capillary (2) into the first vacuum chamber (1b) and then deflected into an RF funnel (7a) by a repelling electric DC potential which is applied to a deflector electrode (6a). The transfer capillary is preferably a short wide bore capillary with an inner diameter of 1 mm or more and a length of 180 mm or less.

The vacuum chamber (1b) is held at an elevated pressure between 1000 Pa and 3000 Pa and comprises a sub-ambient electrospray source (spray emitter (3b), spray plume (4b)). The spray emitter (3b) is positioned in an aperture of the deflector electrode (6a). Ions from the spray plume (4b) are directly introduced into the entrance of the RF funnel (7a).

The electrospray ion sources (3a, 4a) and (3b, 4b) can be operated simultaneously or separately from each other. Separation devices (not shown), like liquid chromatography devices or electrophoretic devices, can be coupled to the spray emitters (3a, 3b).

The RF funnel (7a) is a dipolar RF funnel and built as a stack of apertured electrodes. The apertures of the electrodes taper to smaller diameters thus forming an inner volume in the shape of a funnel. The two phases of an RF voltage are applied alternately to the electrodes for generating an RF pseudo-potential which keeps ions away from the inner wall of the RF funnel (7a). The ions are driven to and through the narrow end of the RF funnel (7a) into vacuum chamber (1c) of the TIMS analyzer (102) by a gas flow (8a) and optionally by an additional DC potential gradient applied to the aperture electrodes.

The TIMS analyzer (102) comprises an RF funnel (7b) and a separating region (9) both of which are located in a vacuum chamber (1c). The vacuum chamber (1c) is held at a pressure lower than the pressure of the first vacuum chamber (1b), preferably between 100 Pa and 300 Pa. The RF funnel (7a) and the TIMS analyzer (102) are arranged orthogonally, i.e. the axis between the RF funnel (7a) and the axis of the separating region (9) is substantially 90°.

Ions introduced into the vacuum chamber (1c) are deflected into the RF funnel (7b) by a repelling electric DC potential which is applied to a deflector electrode (6b). The RF funnel (7b) is a quadrupolar RF funnel which enables a smooth transition to the RF field of the separating region (9). The separation region (9) has a length of about five centimeters only and an inner diameter of about eight millimeters. It is constructed as a segmented linear RF quadrupole. According to published U.S. Patent Application 2017/0350860 (Raether et al.), the separating region and, in particular, a separated trapping region or parts thereof can also be constructed as RF multipoles with a higher order than an RF quadrupole. The quadrupolar RF field confines the ions on the axis of the separating region (9). A gas flow (8b), which is generated by pumping gas away from the vacuum chamber (1c) at the exit of the separating region (9), drives ions against a ramp of a counteracting electric DC field barrier of the TIMS analyzer (102) such that the ions are axially trapped and get separated according to their mobilities at locations along the ramp. After loading the TIMS analyzer (102) with ions, the height of the counteracting electric DC field barrier is steadily decreased such that ion species are released in the sequence of their mobility. The velocity of the gas flow (8b) is in the order of 100 m/s.

Gas is pumped away from the ion source (101) and the TIMS analyzer (102) by pumping ports (5a-5c) and through the exit of the separating region (9) which is adjacent to the vacuum chamber of the mass filter (103) (not shown in FIG. 1B).

Figure 2A:
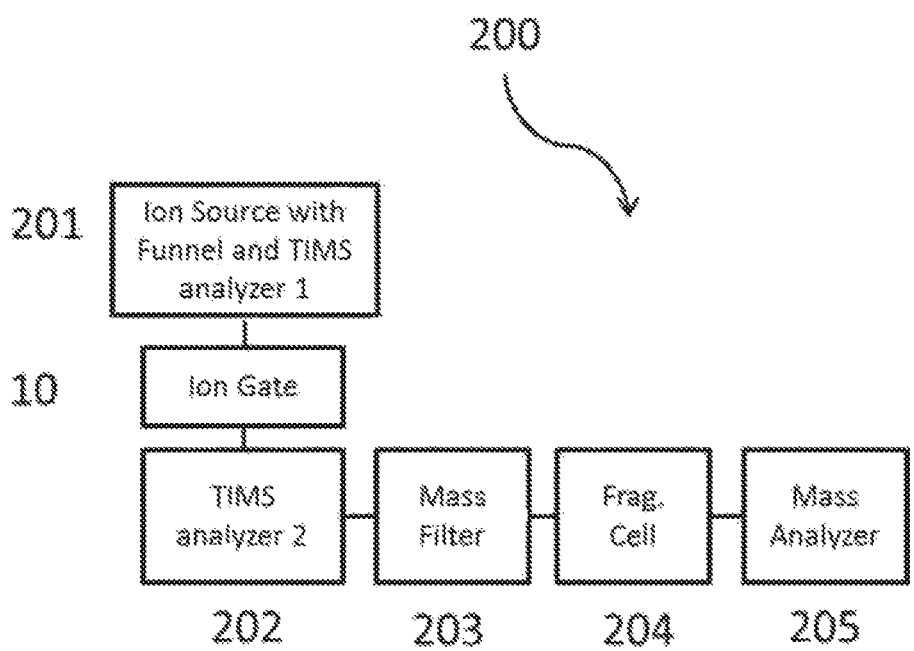
FIG. 2A shows a schematic of a second exemplary mass spectrometric system (200) which comprises an ion source (201) with an RF funnel and a first TIMS analyzer, a second TIMS analyzer (202), a mass filter (203), a fragmentation cell (204) and a mass analyzer (205).

FIG. 2A shows a schematic of a second example of a mass spectrometric system according to the present invention. The mass spectrometric system (200) comprises an ion source (201) with an RF funnel and a first TIMS analyzer, an ion gate (10), a second TIMS analyzer (202), a mass filter (203), a fragmentation cell (204) and a mass analyzer (205). The mass analyzer (205) is preferably a time-of-flight analyzer with orthogonal ion injection (OTOF-MS).

Figure 2B:
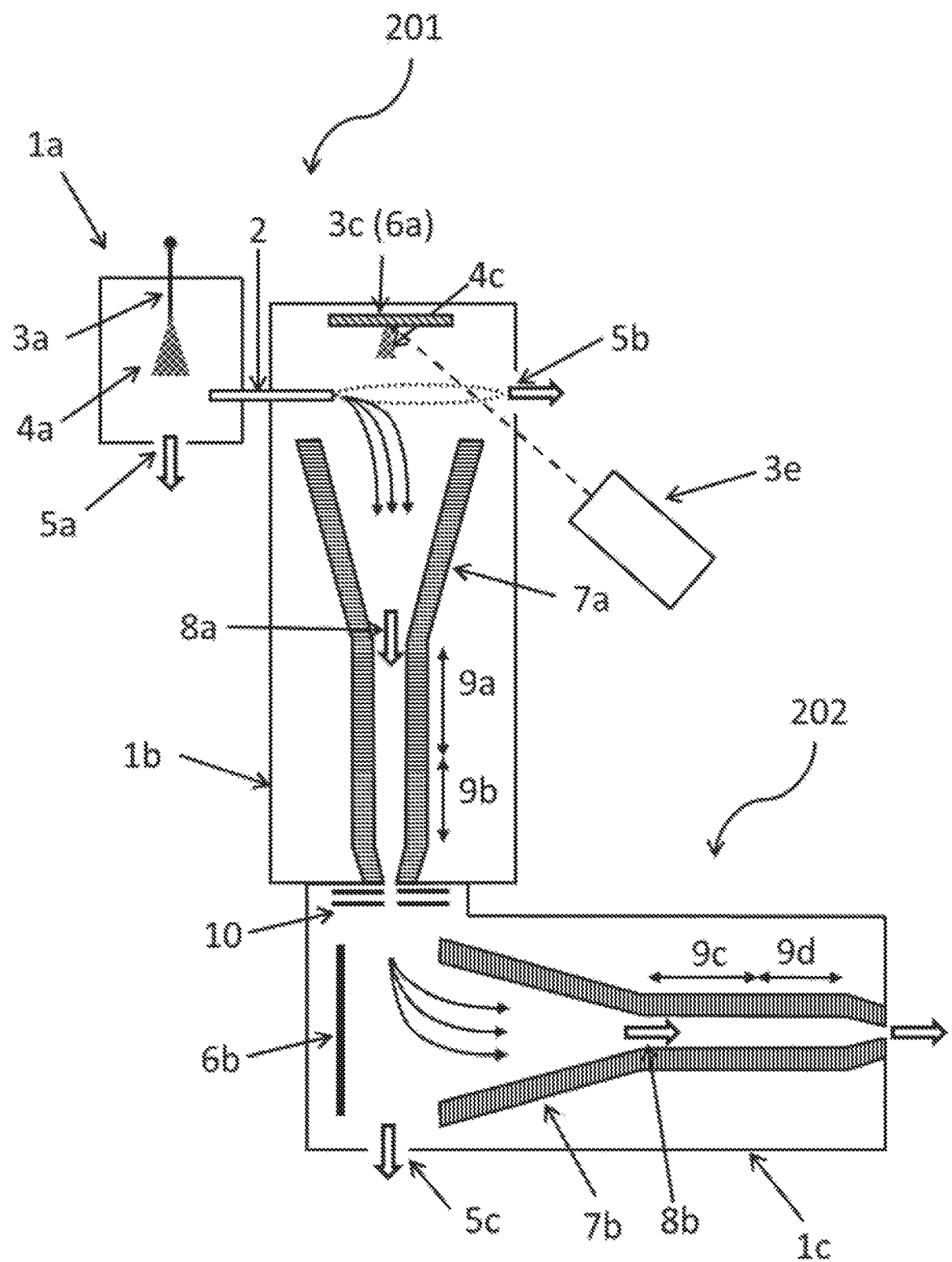
FIG. 2B shows the ion source (201) with an RF funnel and a first TIMS analyzer and the TIMS analyzer (202) of the mass spectrometric system (200) in more detail.

FIG. 2B shows the ion source (201) with an RF funnel and a first TIMS analyzer, the ion gate (10) and the TIMS analyzer (202) in more detail.

The ion source comprises two chambers (1a, 1b).

The chamber (1a) is held at atmospheric pressure and incorporates an electrospray ion source (spray emitter (3a), spray plume (4a)). Ions from the spray plume (4a) are introduced via a transfer capillary (2) into a first vacuum chamber (1b). The transfer capillary is preferably a short wide bore capillary with an inner diameter of 1 mm or more and a length of 180 mm or less. The vacuum chamber (1b) is held at an elevated pressure between 1000 Pa and 3000 Pa and comprises a sub-ambient MALDI source (MALDI plate with sample plate (3c), MALDI plume (4c), MALDI laser (3e)). Ions introduced via a transfer capillary (2) can be deflected into the entrance of the RF funnel (7a) by a repelling electric DC potential which is applied to the MALDI plate (3c) or a replacement electrode (not shown). Ions from the MALDI plume (4c) are directly introduced into the entrance of the RF funnel (7a).

The electrospray ion source (3a, 4a) and the MALDI source (3c, 4c, 3e) can be operated simultaneously or separately from each other. Separation devices (not shown), like liquid chromatography devices or electrophoretic devices, can be coupled to the spray emitter (3a).

The RF funnel (7a) is a quadrupolar RF funnel and built as a stack of segmented apertured electrodes. Each aperture electrode comprises four segments. The apertures of the electrodes taper to smaller diameters thus forming an inner volume in the shape of a funnel. The two phases of an RF voltage are applied alternately to adjacent segments of each single electrode and to adjacent segments of neighboring electrodes. The generated RF pseudo-potential keeps ions away from the inner wall of the RF funnel (7a).

The ions are driven by a gas flow (8a) into the first TIMS analyzer which comprises a trapping region (9a) and a separating region (9b). The gas flow (8a) is generated by pumping gas away from the vacuum chamber (1b) at the exit of the separating region (9b). The quadrupolar RF funnel (7a) enables a smooth transition to RF field of the trapping region (9a).

The combined length of both regions (9a) and (9b) is about 7 centimeters. It is constructed as a segmented linear RF quadrupole. According to published U.S. Patent Application 2017/0350860 (Raether et al.), the separating region and, in particular, the trapping region or parts thereof can also be constructed as RF multipoles with a higher order than an RF quadrupole. The quadrupolar RF field confines the ions on the axis of the regions (9a) and (9b).

The first TIMS analyzer is preferably operated in a parallel accumulation mode, i.e. the first TIMS analyzer accumulates ions in the trapping region (9a) while pre-accumulated ions are analyzed in the separating region (9b) parallel in time. The gas flow (8a) drives ions exiting the RF funnel (7a) against a ramp of a counteracting electric DC field barrier of the trapping region (9a) such that the ions are axially trapped and get separated according to their mobilities at locations along the ramp. During the accumulation of ions in the trapping region (9a), the gas flow (8a) also drives ions, which have been accumulated in a prior accumulation and transferred to the separating region (9b), against a ramp of a counteracting electric DC field barrier of the separating region (9b) such that the ions get axially trapped and spatially separated according to their mobilities. After loading the separating region (9b) with ions to be analyzed, the height of the counteracting electric DC field barrier is steadily decreased such that ion species are released from the separating region (9b) in the sequence of their mobility. The velocity of the gas flow (8a) is in the order of 100 m/s and the operating pressure of the first TIMS is substantially the pressure of the first vacuum chamber (1b).

The second TIMS analyzer (202) comprises a quadrupolar RF funnel (7b), a trapping region (9c) and a separating region (9d). The RF funnel (7a) and the second TIMS analyzer (202) are arranged orthogonally, i.e. the axis between the RF funnel (7a) and the common axis of the regions (9c) and (9d) is substantially 90°.

The vacuum chamber (1c) of the second TIMS analyzer (202) is held at a pressure lower than the pressure of the first vacuum chamber (1b), preferably between 100 Pa and 300 Pa. Ions introduced into the vacuum chamber (1c) are deflected into the quadrupolar RF funnel (7b) by a repelling electric DC potential which is applied to a deflector electrode (6b) and then guided by a gas flow (8b) towards the exit of the quadrupolar RF funnel (7b) into the trapping region (9c). The gas flow (8b) is generated by pumping gas away from the vacuum chamber (1c) at the exit of the separating region (9d). The velocity of the gas flow (8b) is in the order of 100 m/s and the operating pressure of the second TIMS (202) is substantially the pressure of the second vacuum chamber (1c).

Like the first TIMS analyzer (9a, 9b), the second TIMS analyzer (202) is preferably operated in the parallel accumulation mode as described above, i.e. that ions are accumulated in the trapping region (9c) while pre-accumulated ions are analyzed in the separating region (9d) parallel in time. Gas is pumped away from the ion source (201) and the second TIMS analyzer (202) by pumping ports (5a-5c) and through the exit of the separating region (9d) which is adjacent to the vacuum chamber of the mass filter (203) (not shown in FIG. 2B).

The ion gate (10) is an ion einzel lens. Other embodiments may comprise a Tyndall gate or a Bradbury-Nielsen gate operated with electric DC voltages wherein wires of the gate are alternately supplied with positive and negative electric DC potentials. Alternatively, the Bradbury-Nielsen gate may be operated with electric RF potentials, forming reflecting pseudo-potentials around the wires. This RF Bradbury-Nielsen gate presents the additional advantage of reflecting ions of high mobility while transmitting ions of low mobility, the limit of transmission depending on the RF voltage on the wires (gate control voltage).

The first TIMS analyzer (9a, 9b) and second TIMS analyzer (9c, 9d) can be operated in a selective transfer mode as described in U.S. Pat. No. 10,241,079 (Betz et. al), comprising the steps:

providing ions from the atmospheric pressure ESI ion source (3a, 4a) and/or from the sub-ambient MALDI ion source (3c, 4c, 3e) to the first TIMS analyzer (9a, 9b);

separating the ions according to mobility in the first TIMS analyzer (9a, 9b) at the elevated pressure of first vacuum chamber (1b);

selecting ions of one or more disjointed mobility ranges by applying transient electric DC potentials to the electrodes of the ion gate (10) and adjusting the transmission of the ion gate (10);

transferring the selected ions to the trapping region (9c) of a second TIMS analyzer (202);

separating the selected ions according to mobility in the second TIMS analyzer (202); and analyzing the separated ions by mass spectrometry or tandem mass spectrometry using the downstream mass analyzer (205) and optionally the downstream mass filter (203) and fragmentation cell (204).

The ion gate (10) can be operated by adjusting the transmission of the ion gate such that the transmission for ions in at least one limited mobility range is reduced, preferably such that unwanted ions are eliminated or at least substantially reduced and that the transmission for highly abundant ion species of interest is lower than the transmission of less abundant ion species of interest.

Preferably, the steps of separating in the first TIMS analyzer (9a, 9b) and selecting are repeated and the transferred ions are accumulated in the trapping region (9c) of the second TIMS analyzer (202) prior to transferring them to and separating them in the separating region (9d). The repetition rate of separations in the first TIMS analyzer (9a, 9b) is preferably a factor of 2, 5, 10 or 20 higher than the repetition rate of separations in the second TIMS analyzer (9c, 9d).

The mobility resolution of a TIMS analyzer approximately scales with $p^{3/4}$ (p=pressure) and the average mobility resolution is approximately proportional to $(f_{TIMS})^{-1/4}$ ($f_{TIMS}$=repetition rate). Since the pressure of vacuum chamber (1b) is higher than the pressure of vacuum chamber (1c), the average mobility resolution of the first TIMS analyzer (9a, 9b) can be equal or even higher than the average mobility resolution of the second TIMS (9c, 9d) even at a higher repetition rate. The higher repetition rate of the first TIMS analyzer (9a, 9b) is advantageous because it reduces space charge in the first TIMS analyzer (9a, 9b) as well as in the second TIMS analyzer (9c, 9d), in particular by reducing the amount of highly abundant ion species during a selective transfer, and enables analyzing high ion currents and thus achieving lower limits of detection and increasing the dynamic range.

The first (9a, 9b) and second (9c, 9d) TIMS analyzer can be also operated in a tandem IMS mode, comprising the steps:
- providing ions from the atmospheric pressure ESI ion source (3a, 4a) and/or from the sub-ambient MALDI ion source (3c, 4c, 3e) to the first TIMS analyzer (9a, 9b);
- separating the ions according to mobility in the first TIMS analyzer (9a, 9b) at the elevated pressure of first vacuum chamber (1b);
- selecting ion species of a limited mobility range by applying transient electric DC potentials to the electrodes of the ion gate (10) and adjusting the transmission of the ion gate (10);
- fragmenting the selected ions by accelerating the selected ions into the vacuum chamber (1c) using electric DC potentials applied to the electrodes of the ion gate (10);
- transferring the fragment ions to the trapping region (9c) of a second TIMS analyzer (202);
- separating the fragment ions according to mobility in the second TIMS analyzer (202); and
- analyzing the separated fragment ions by mass spectrometry or tandem mass spectrometry using the downstream mass analyzer (205) and optionally the downstream mass filter (203) and fragmentation cell (204).

Figure 3A:
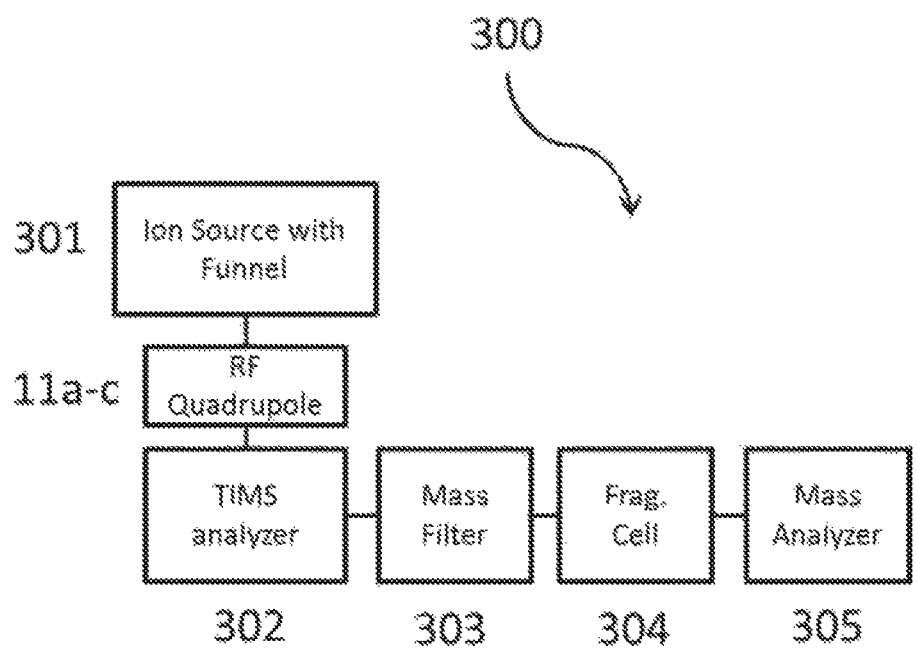
FIG. 3A shows a schematic of third exemplary mass spectrometric system (300) comprising an ion source (301) with an RF funnel, an RF quadrupole (11a, 11b, 11c), a TIMS analyzer (302), a mass filter (303), a fragmentation cell (304) and a mass analyzer (305).

FIG. 3A shows a schematic of a third example of a mass spectrometric system according to the present invention. The mass spectrometric system (300) comprises an ion source (301) with an RF funnel, an RF quadrupole (11a, 11b, 11c) and a TIMS analyzer (302), a mass filter (303), a fragmentation cell (304) and a mass analyzer (305). The mass analyzer (305) is preferably a time-of-flight analyzer with orthogonal ion injection (OTOF-MS).

Figure 3B:
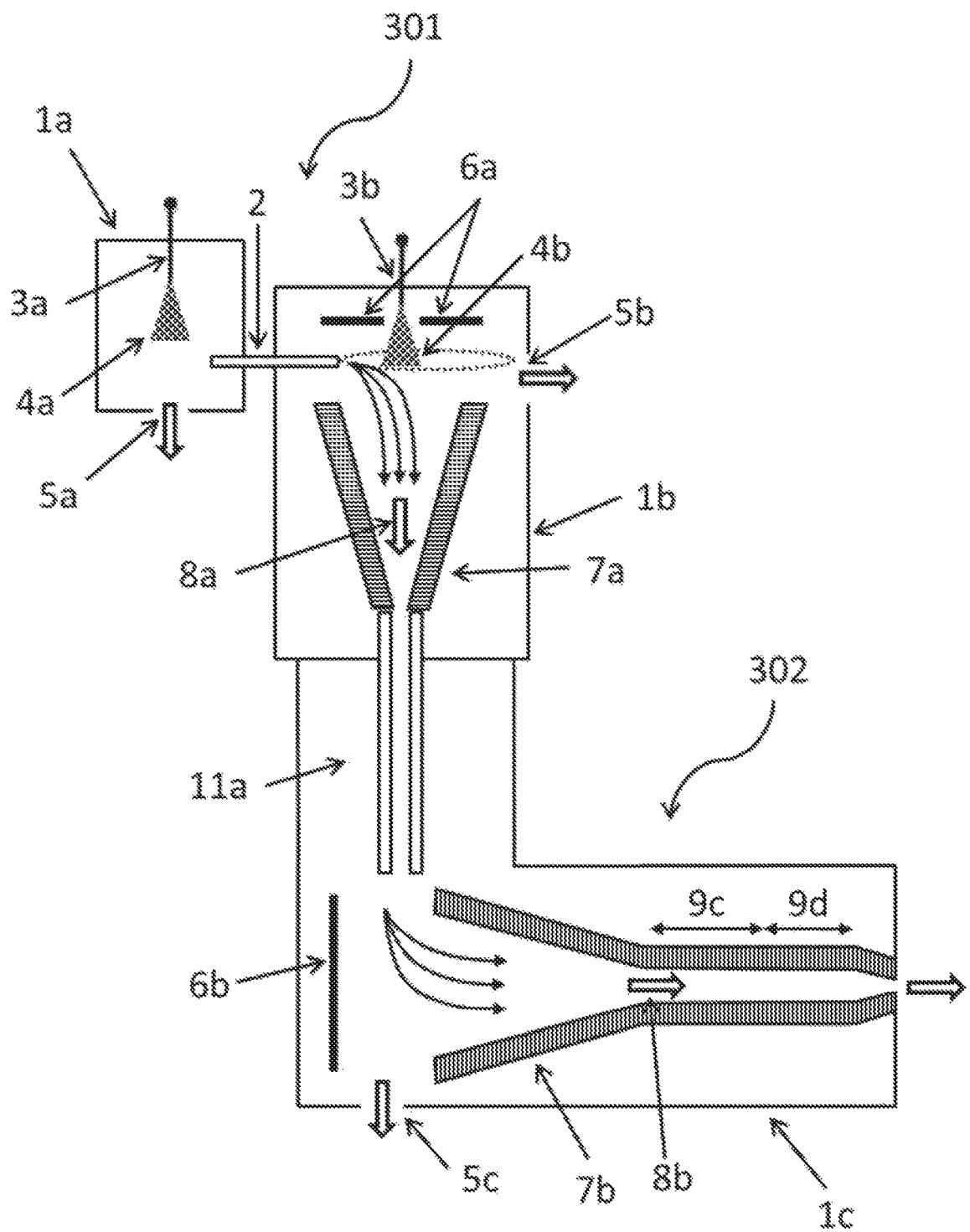
FIGS. 3B-3D show variants of the ion source (301) with an RF funnel, the RF quadrupoles (11a, 11b, 11c) and the TIMS analyzer (302) of the mass spectrometric system (300) in more detail.

FIG. 3B shows a first variant of the ion source (301) with RF funnel, the RF quadrupole (11a) and the TIMS analyzer (302) in more detail.

The chamber (1a) is held at atmospheric pressure and incorporates an electrospray ion source (spray emitter (3a), spray plume (4a)). Ions from the spray plume (4a) are introduced via a transfer capillary (2) into a first vacuum chamber (1b) and deflected into the RF funnel (7a) by a repelling electric DC potential which is applied to a deflector electrode (6a). The transfer capillary is preferably a short wide bore capillary with an inner diameter of 1 mm or more and a length of 180 mm or less.

The vacuum chamber (1b) is held at an elevated pressure between 1000 Pa and 3000 Pa and comprises a sub-ambient electrospray source (spray emitter (3b), spray plume (4b)). The spray emitter (3b) is positioned in an aperture of the deflector electrode (6a). Ions from the spray plume (4b) are directly introduced into the entrance of the RF funnel (7a). The electrospray ion sources (3a, 4a) and (3b, 4b) can be operated simultaneously or separately from each other. Separation devices (not shown), like liquid chromatography devices or electrophoretic devices, can be coupled to the spray emitters (3a, 3b).

The RF funnel (7a) is a quadrupolar RF funnel and built as a stack of segmented apertured electrodes. The ions are driven by a gas flow (8a) into and through the RF quadrupole (11a) which bridges the vacuum chambers (1b) and (1c). The gas flow (8a) is generated by pumping gas away from the vacuum chamber (1b) through RF quadrupole (11a). The quadrupolar RF funnel (7a) enables a smooth transition to RF fields of the RF quadrupole (11a).

The TIMS analyzer (302) comprises a quadrupolar RF funnel (7b), a trapping region (9c) and a separating region (9d). The RF funnel (7a) and the second TIMS analyzer (302) are arranged orthogonally, i.e. the axis between the RF funnel (7a) and the common axis of the regions (9c) and (9d) is substantially 90°.

The vacuum chamber (1c) of the second TIMS analyzer (302) is held at a pressure lower than the pressure of the first vacuum chamber (1b), preferably between 100 Pa and 300 Pa. Ions are introduced at the exit of the RF quadrupole (11a) into the vacuum chamber (1c), deflected into the quadruploar RF funnel (7b) by a deflector electrode (6b) and then guided by a gas flow (8b) into the trapping region (9c) of the TIMS analyzer (302). The gas flow (8b) is generated by pumping away gas from the vacuum chamber (1c) at the exit of the separating region (9d). The velocity of the gas flow (8b) is in the order of 100 m/s and the operating pressure of the second TIMS (302) is substantially the pressure of the second vacuum chamber (1c). Gas is further pumped away from the ion source (301) and the TIMS analyzer (302) by pumping ports (5a-5c).

The TIMS analyzer (302) is preferably operated in the parallel accumulation mode as described above, i.e. that ions are accumulated in the trapping region (9c) while pre-accumulated ions are analyzed in the separating region (9d) parallel in time.

The RF quadrupole (11a) is preferably operated like a quadrupole mass filter, either like a band-pass filter or a high-pass filter. Since the RF quadrupole (11a) is located between the vacuum chambers (1b) and (1c), the RF quadrupole (11a) is operated at an elevated pressure above 100 Pa. At this elevated pressure, the filtering characteristic of the RF quadrupole (11a) also depends on the mobility of the ions such that the RF quadrupole (11a) is effectively operated as a combined mass-mobility filter. The mass-mobility filter can be used to filter out low mass ions which often make up a large part of the unwanted chemical background and space charge, in particular in the trapping region of a TIMS analyzer.

Figure 3C:
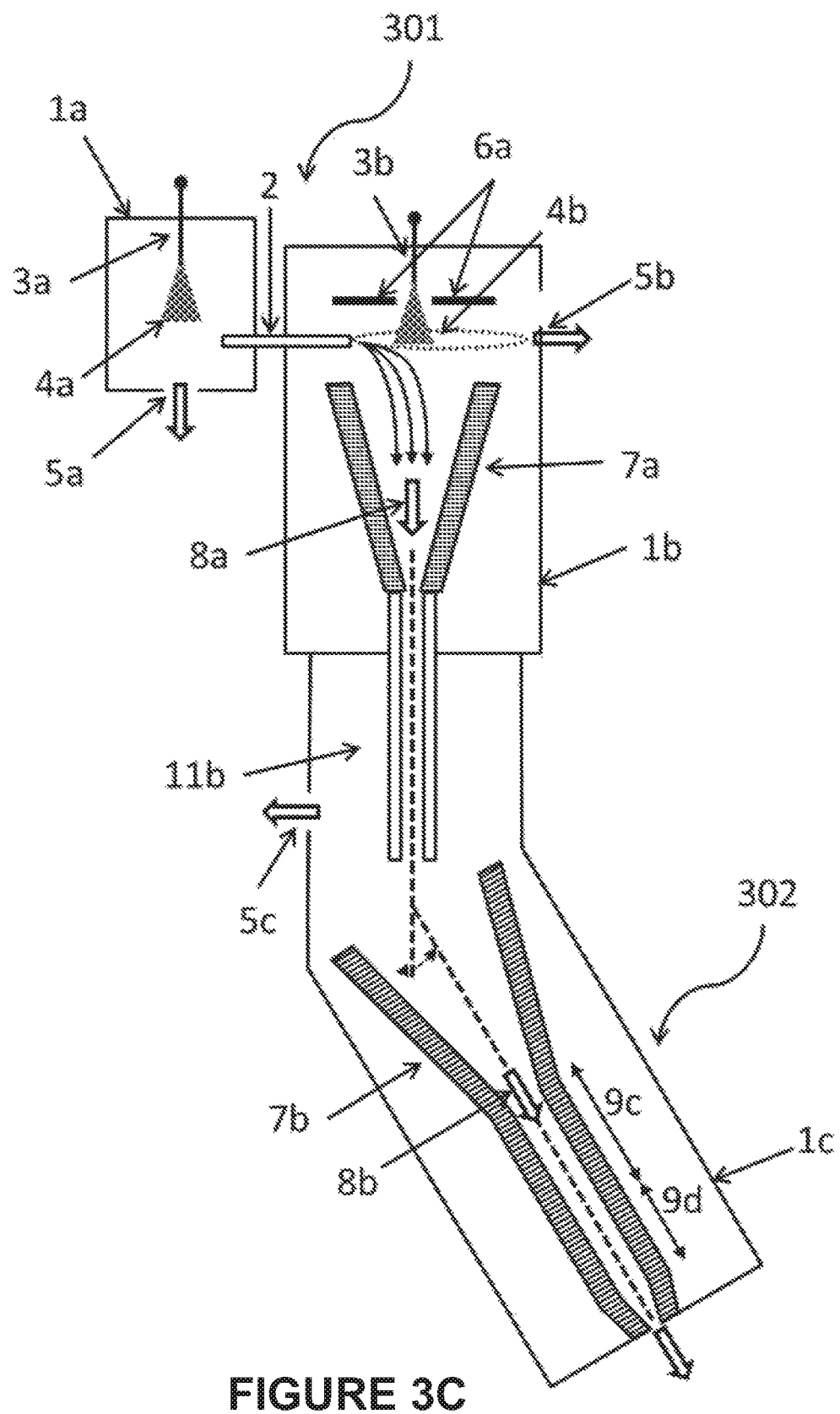

FIG. 3C shows a second variant of the ion source (301) with the RF funnel, the RF quadrupole (11b) and the TIMS analyzer (302) in more detail. The RF funnel (7a) and the second TIMS analyzer (302) are still arranged non-collinearly, but are not arranged orthogonally. The axis between the RF funnel (7a) and the common axis of the regions (9c) and (9d) is about 20°.

Compared to FIG. 3B, ions, which are introduced at the exit of the RF quadrupole (11b) into the vacuum chamber (1c), are not deflected into the quadrupolar RF funnel (7b) by a deflector electrode (6b), but are directly collected by a quadrupolar RF funnel (7b) and then guided by a gas flow (8b) into the trapping region (9c) of the TIMS analyzer (302).

Figure 3D:
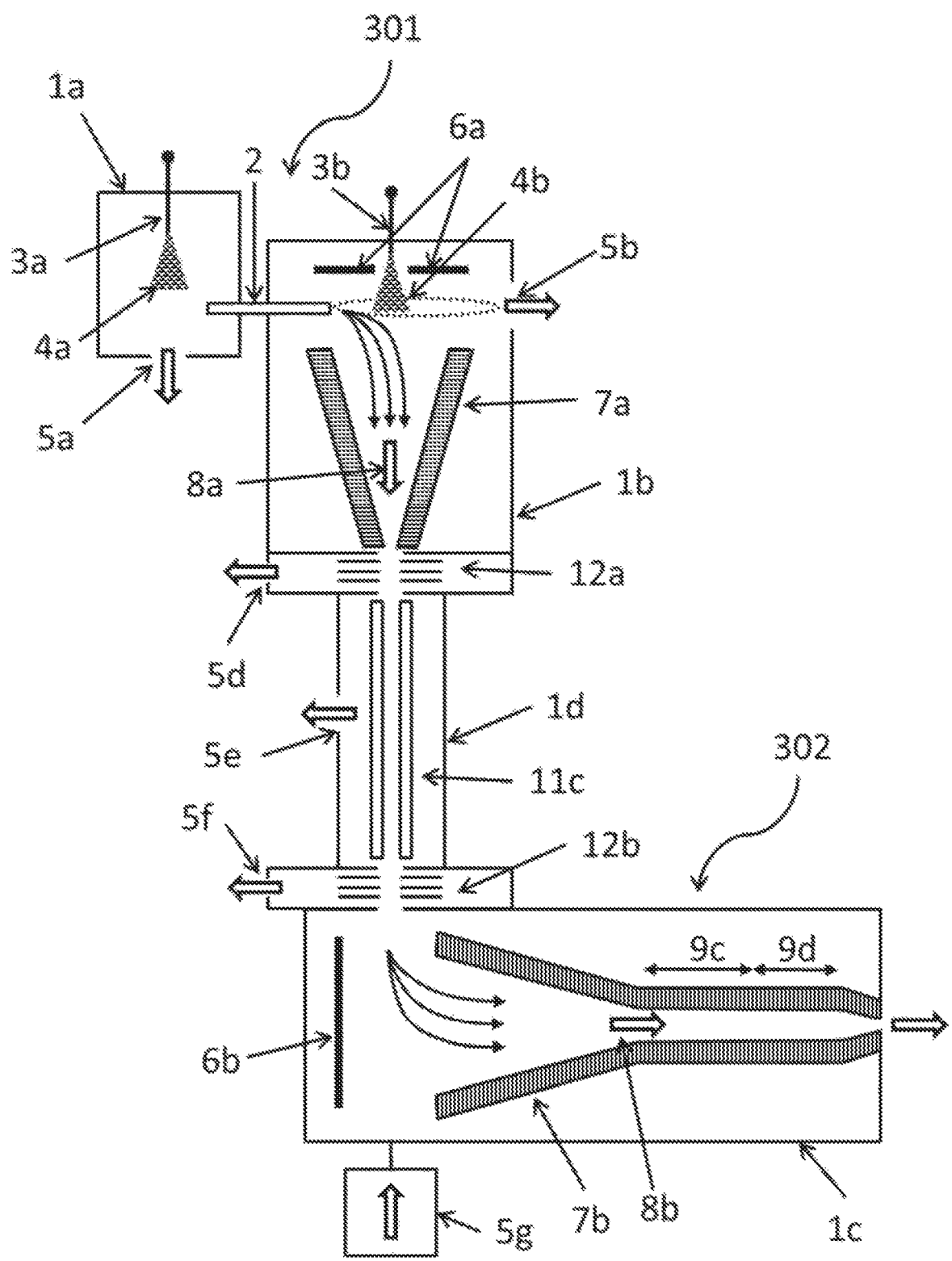

FIG. 3D shows a third variant of the ion source (301) with the RF funnel, the RF quadrupole (11c) and the TIMS analyzer (302) in more detail. The RF funnel (7a) and the second TIMS analyzer (302) are arranged orthogonally, i.e. the axis between the RF funnel (7a) and the common axis of the regions (9c) and (9d) is substantially 90°.

Compared to FIG. 3B, the RF quadrupole (11c) does not bridge the vacuum chambers (1b) and (1c), but is located in a separate vacuum chamber (1d). The vacuum chamber (1d) is differentially pumped using pumping ports (5d), (5e) and (5f) and held at a pressure below 10 Pa while the pressure in vacuum chamber (1b) is between 1000 Pa and 3000 Pa and the pressure in vacuum chamber (1c) is between 100 Pa and 300 Pa. Ions are introduced from the exit of the RF funnel (7a) into the entrance of the RF quadrupole (11c) by an electrostatic einzel lens (12a). The einzel lens (12b) is used to transfer the ions from the exit of the RF quadrupole (11c) into the vacuum chamber (1c). The gas flow (8b) is generated by introducing gas into the vacuum chamber (1c) at the gas inlet (5g) and pumping away gas from the vacuum chamber (1c) at the exit of the separating region (9d).

Since the RF quadrupole (11c) is operated at lower pressure than in FIGS. 3B and 3C, the RF quadrupole (11c) can substantially be operated as a mass filter, rather than a mass-mobility filter.

Figure 4A:
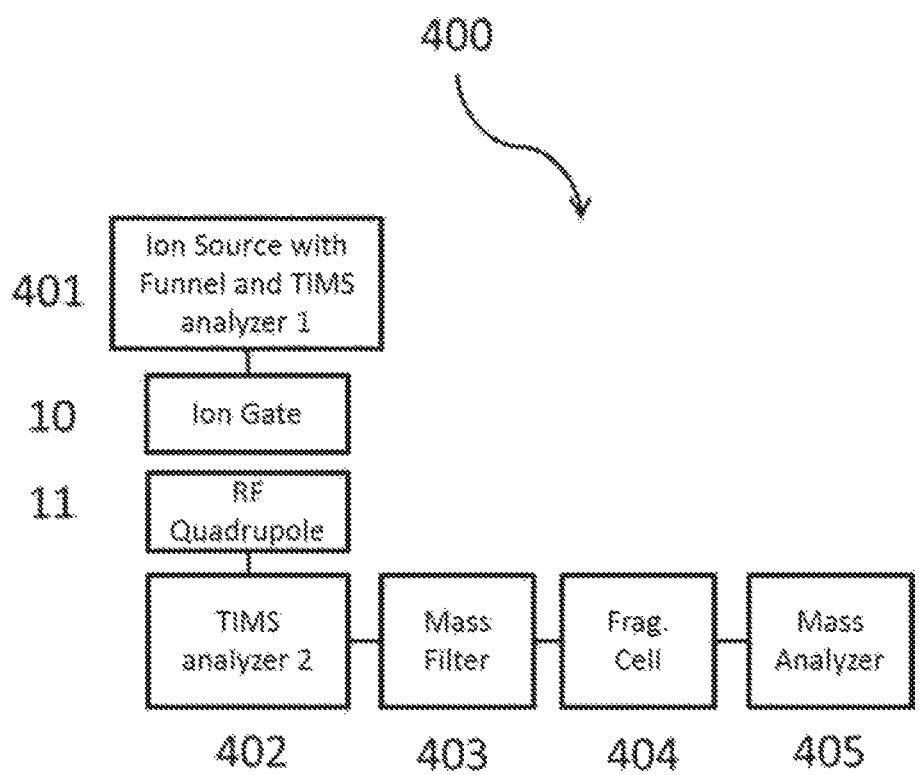
FIG. 4A shows a schematic of a fourth exemplary mass spectrometric system (400) comprising an ion source (401) with an RF funnel and a first TIMS analyzer, an ion gate (10), a RF quadrupole (11), a second TIMS analyzer (402), a mass filter (403), a fragmentation cell (404) and a mass analyzer (405).

FIG. 4A shows a schematic of a fourth example of a mass spectrometric system according to the present invention. The mass spectrometric system (400) comprises an ion source (401) with an RF funnel and a first TIMS analyzer, an ion gate (10), an RF quadrupole (11), a second TIMS analyzer (402), a mass filter (403), a fragmentation cell (404) and a mass analyzer (405). The mass analyzer (405) is preferably a time-of-flight analyzer with orthogonal ion injection (OTOF-MS).

Figure 4B:
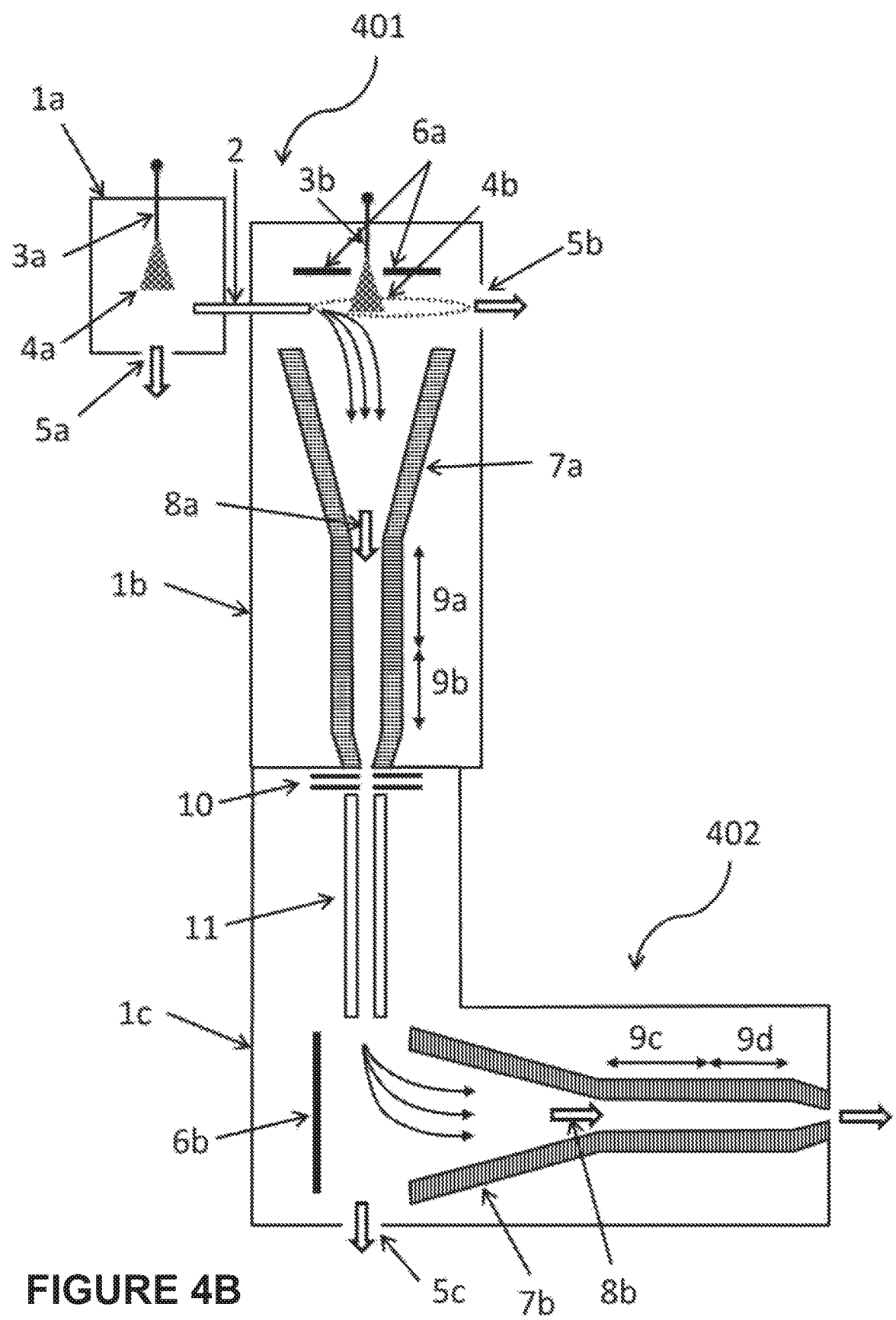
FIG. 4B shows the ion source (401) with an RF funnel and a first TIMS analyzer, the ion gate (10), the RF quadrupole (11) and the TIMS analyzer (402) of the mass spectrometric system (400) in more detail.

FIG. 4B shows the ion source (401) with an RF funnel and a first TIMS analyzer, the ion gate (10), the RF quadrupole (11) and the TIMS analyzer (402) in more detail.

The first TIMS analyzer of the ion source (401) comprises a quadrupolar RF funnel (7a), a trapping region (9a) and a separating region (9b). The second TIMS analyzer (402) comprises a quadrupolar RF funnel (7b), a trapping region (9c) and a separating region (9d). The RF funnel (7a) and the second TIMS analyzer (402) are arranged orthogonally, i.e. the axis between the RF funnel (7a) and the common axis of the regions (9c) and (9d) is substantially 90°. The first TIMS analyzer (9a, 9b) and the second TIMS analyzer (9c, 9d) are preferably operated in the parallel accumulation mode as described above. The vacuum chamber (1b) is held at a pressure at an elevated pressure between 1000 Pa and 3000 Pa, and the vacuum chamber (1c) is held at a pressure lower than the pressure of the first vacuum chamber (1b), preferably between 100 Pa and 300 Pa.

The mass spectrometric system (400) differs from the mass spectrometric system (200) in that the RF quadrupole (11) is added and located in the vacuum chamber (1c). Furthermore, the MALDI source in the vacuum chamber (1b) is replaced by the sub-ambient electrospray source of the mass spectrometric system (100).

The ion gate (10) can be operated in a selective transfer mode or tandem IMS mode. In the selective transfer, transient electric DC potentials are applied to the electrodes of the ion gate (10) such that the transmission for ions in at least one limited mobility range is reduced, preferably such that unwanted ions are eliminated or at least substantially reduced and that the transmission for highly abundant ion species of interest is lower than the transmission of less abundant ion species of interest. In the tandem IMS mode, transient electric DC potentials are applied to the electrodes of the ion gate (10) such that only ion species of a limited mobility range are selected and fragmented by accelerating the selected ions into the vacuum chamber (1c) using electric DC potentials applied to the electrodes of the ion gate (10).

The RF quadrupole (11) can be operated as a CID fragmentation cell, e.g. in the tandem TIMS mode, or as a combined mass-mobility filter as in the mass spectrometric system (300).

Figure 5A:
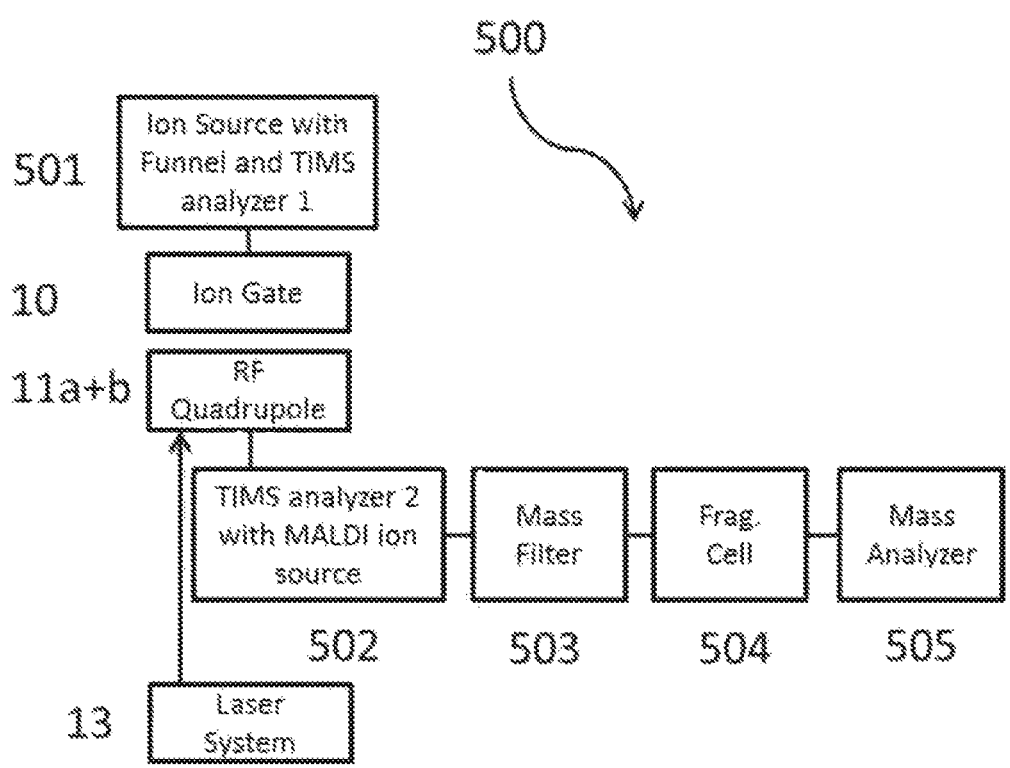
FIG. 5A shows a schematic of a fifth exemplary mass spectrometric system (500) comprising an ion source (501) with an RF funnel and a first TIMS analyzer, an ion gate (10), a RF quadrupole (11a), a laser system (13), a second TIMS analyzer (502), a mass filter (503), a fragmentation cell (504) and a mass analyzer (505).

The mass spectrometric systems (400) enables a plurality of operational modes of hybrid IMS/MS analysis:

MS (without IMS separation)
Tandem MS (without IMS separation)
IMS separation/(tandem) MS
IMS separation with selection/IMS separation/(tandem) MS
IMS separation with selection/mass-mobility filtering/IMS separation/(tandem) MS
Tandem IMS with fragmentation by CID/(tandem) MS
Tandem IMS with fragmentation by CID and mass-mobility filtering/(tandem) MS FIG. 5A shows a schematic of a fifth example of a mass spectrometric system according to the present invention. The mass spectrometric system (500) comprises an ion source (501) with an RF funnel and a first TIMS analyzer, an ion gate (10), a RF quadrupole (11a), a laser system (13), a second TIMS analyzer (502), a mass filter (503), a fragmentation cell (504) and a mass analyzer (505). The mass analyzer (505) is preferably a time-of-flight analyzer with orthogonal ion injection (OTOF-MS).

Figure 5B:
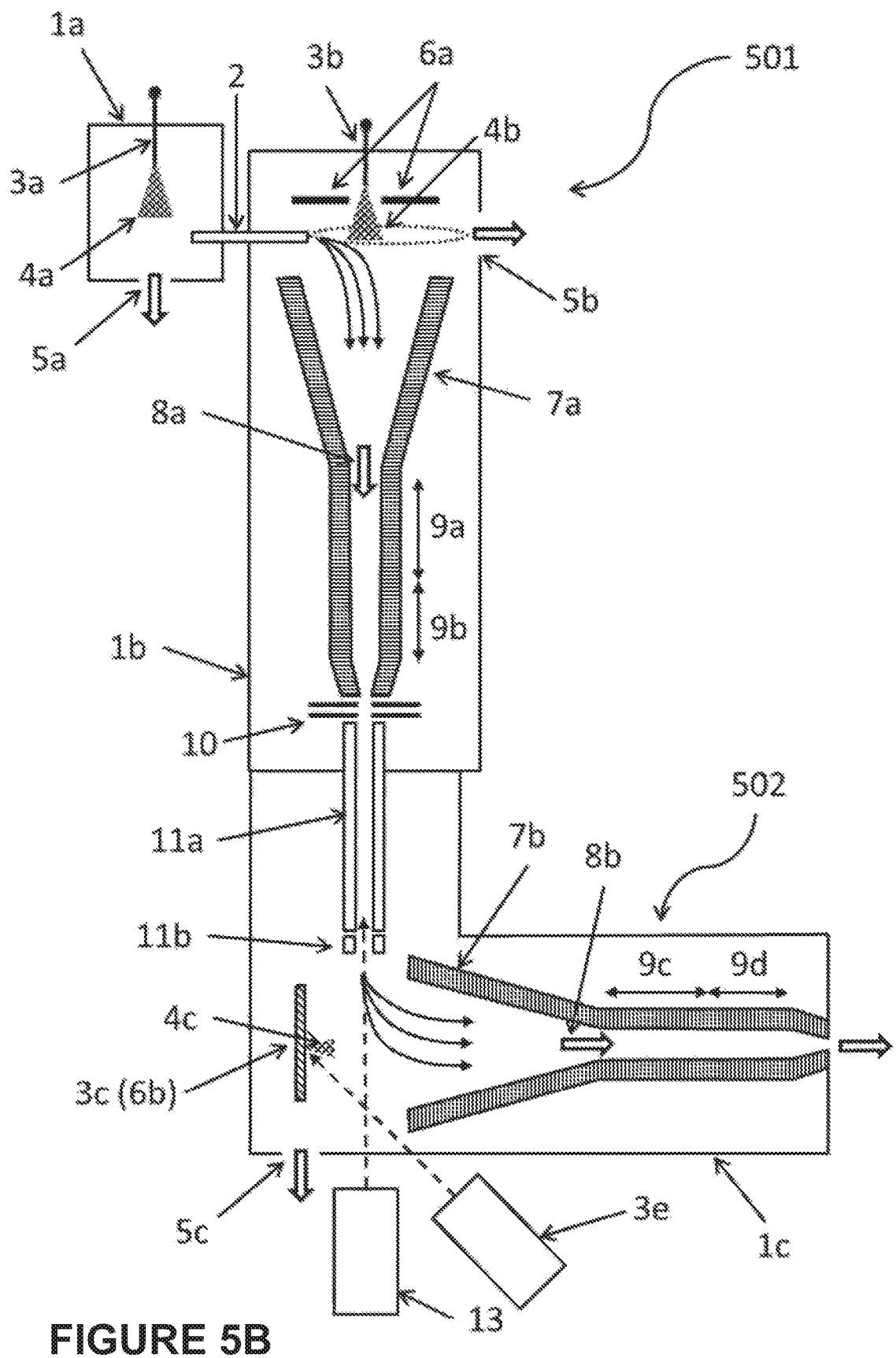
FIGS. 5B-5C show variants of the ion source (501) with an RF funnel and a first TIMS analyzer, the ion gate (10), the RF quadrupole (11a), the laser system (13), and the second TIMS analyzer (502) of the mass spectrometric system (500) in more detail.

FIG. 5B shows a first variant of the ion source (501) with an RF funnel and a first TIMS analyzer, the ion gate (10), the RF quadrupole (11a), the laser system (13) and the TIMS analyzer (502) in more detail.

The first TIMS analyzer of the ion source (501) comprises a quadrupolar RF funnel (7a), a trapping region (9a) and a separating region (9b). The second TIMS analyzer (402) comprises a quadrupolar RF funnel (7b), a trapping region (9c) and a separating region (9d). The RF funnel (7a) and the second TIMS analyzer (402) are arranged orthogonally, i.e. the axis between the RF funnel (7a) and the common axis of the regions (9c) and (9d) is substantially 90°. The first TIMS analyzer (9a, 9b) and the second TIMS analyzer (9c, 9d) are preferably operated in the parallel accumulation mode as described above.

The vacuum chamber (1b) is held at an elevated pressure between 1000 Pa and 3000 Pa, and the vacuum chamber (1c) is held at a pressure lower than the pressure of the first vacuum chamber (1b), preferably between 100 Pa and 300 Pa.

The mass spectrometric system (500) differs from the mass spectrometric system (400) in that:
the ion gate (10) is located in the vacuum chamber (1b);
the RF quadrupole (11a) bridges the vacuum chambers (1b) and (1c);
the RF quadrupole (11a) comprises exit electrodes (11b) which can be used to trap ions inside the RF quadrupole (11a);
an additional sub-ambient MALDI source in the vacuum chamber (1c); and
a laser system (13) for generating and introducing photons into the RF quadrupole (11a).

Like in the mass spectrometric system (400), the ion gate (10) can be operated in a selective transfer mode or tandem IMS mode. In the selective transfer, transient electric DC potentials are applied to the electrodes of the ion gate (10) such that the transmission for ions in at least one limited mobility range is reduced, preferably such that unwanted ions are eliminated or at least substantially reduced and that the transmission for highly abundant ion species of interest is lower than the transmission of less abundant ion species of interest. In the tandem IMS mode, transient electric DC potentials are applied to the electrodes of the ion gate (10) such that only ion species of a limited mobility range are selected and fragmented by accelerating the selected ions into the RF quadrupole (11a) using electric DC potentials applied to the electrodes of the ion gate (10).

The RF quadrupole (11a) can be operated as fragmentation cell using CID or photon-induced dissociation (PD), e.g. in the tandem TIMS mode, as an activation cell using collisional-induced activation (CIA) or photon-induced activation (PA), or as a combined mass-mobility filter. By applying appropriate electric DC potentials to the exit electrodes (11b), ions introduced from the first TIMS analyzer (9a, 9b) can be trapped inside the RF quadrupole (11a).

The MALDI source comprises a MALDI plate (3c), MALDI plume 4c, and a MALDI laser (3e). Ions introduced via the RF quadrupole (11a) into the vacuum chamber (1c) are deflected into the entrance of the RF funnel (7b) by a repelling electric DC potential which is applied to the MALDI plate (3c) or a replacement electrode (6b) (not shown). Ions from the MALDI plume (4c) are introduced directly into the entrance of the RF funnel (7b).

The laser system (13) can generate photons in at least one of the vacuum-ultraviolet range (VUV), ultraviolet range (UV) and infrared (IR) range. The photons can be used for single photon induced dissociation (PD), for example by VUVPD or UVPD, or for infrared multi-photon induced dissociation (IRMPD) or for infrared multi-photon activation (IRMPA).

The trapping of ions inside the RF quadrupole (11a) can, for example, be necessary in case that the photon-induced activation or fragmentation is not fast enough to induce the fragmentation or activation while the ions traverse the RF quadrupole (11a). The time needed to induce fragmentation depends on the absorption cross section of the ions and photon density in the RF quadrupole (11a).

The mass spectrometric system (500) enables a plurality of operational modes of hybrid IMS/MS analysis:
  MS (without IMS separation)
  Tandem MS (without IMS separation)
  IMS separation/(tandem) MS
  IMS separation with selection/IMS separation/(tandem) MS
  IMS separation with selection/mass-mobility filtering/IMS separation/(tandem) MS
  tandem IMS with fragmentation by CID or PD/(tandem) MS
  tandem IMS with fragmentation by CID or PD and mass-mobility filtering/(tandem) MS.

Figure 5C:
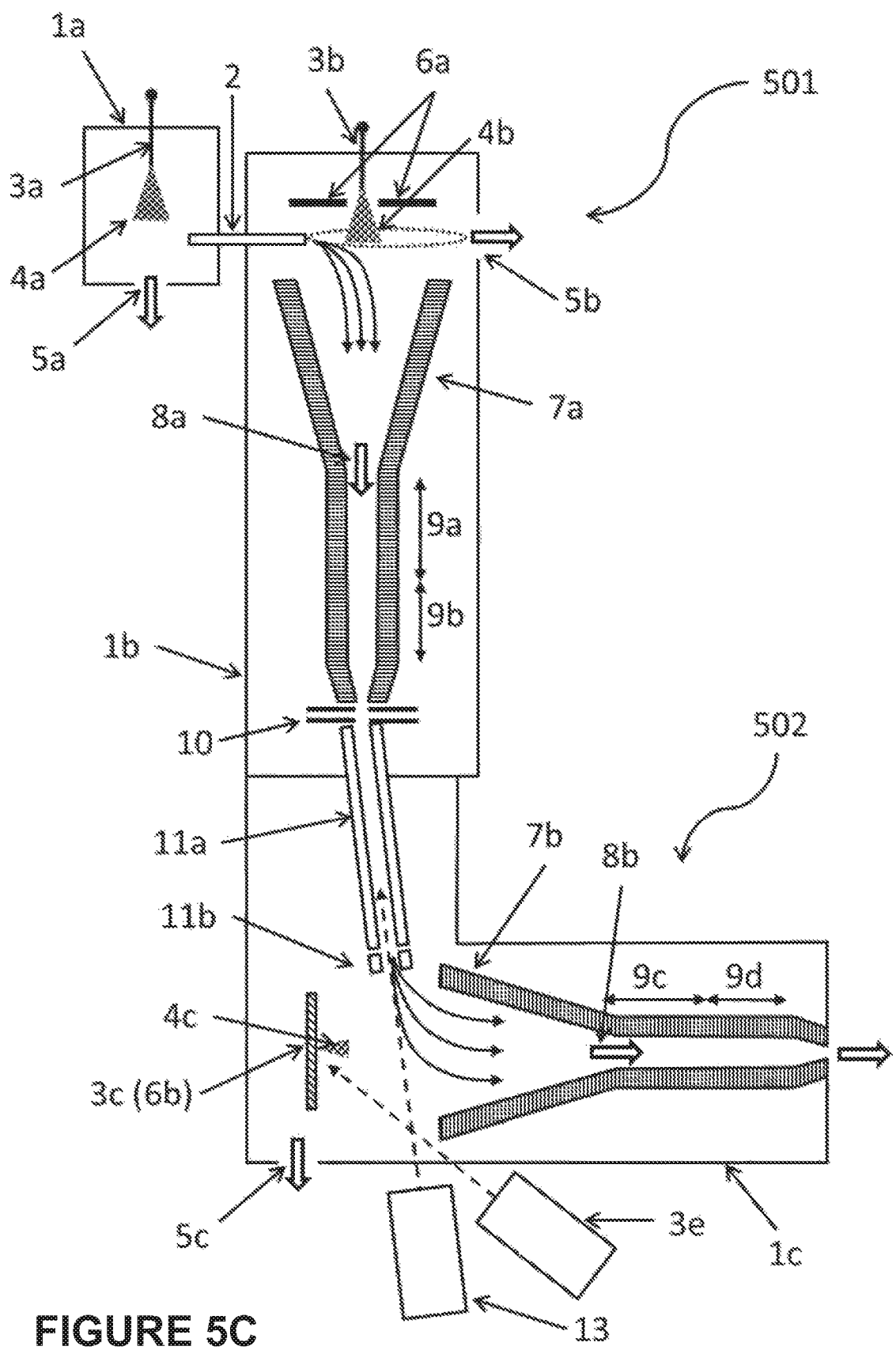

FIG. 5C shows a second variant of the ion source (501) with an RF funnel and a first TIMS analyzer, the ion gate (10), the RF quadrupole (11a), the laser system (13) and the TIMS analyzer (402) in more detail. Here, the axis of the RF quadrupole (11a) is tilted with respect to the axis of the first TIMS analyzer (9a, 9b) such that the photons introduced from the exit end of the RF quadrupole (11a) cannot interact with ions inside the first TIMS analyzer (9a, 9b).

Optionally, the MALDI laser (3e) and the laser system (13) might be a single multiple wavelength laser system, for example a diode pumped solid state Nd:YAG laser system. The fundamental of the Nd:YAG laser system at a wavelength of 1064 nm or the pump light produced by laser emitting diodes can be used for IRMPD or IRMPA, the third harmonic at a wavelength 355 nm can be used as light source for the sub-ambient MALDI source (3c, 4c), and the fourth harmonics at a wavelength 266 nm can be used for UVPD and, optionally for post-ionization of the MALDI process.

The invention claimed is:

1. A mass spectrometric system comprising an ion source, a first RF funnel, a second RF funnel, an RF multipole or RF ion tunnel, an ion mobility analyzer and a mass analyzer,
  wherein the first RF funnel is arranged non-collinearly to the ion mobility analyzer and the second RF funnel is located at the entrance of the ion mobility analyzer and is collinearly arranged to the ion mobility analyzer, and
  wherein the RF multipole or the RF ion tunnel is located between the first RF funnel and the second RF funnel.

2. The mass spectrometric system according to claim 1, wherein the angle between the axis of the first RF funnel and the axis of the ion mobility analyzer is substantially 90°.

3. The mass spectrometric system according to claim 1, wherein the first RF funnel and the ion mobility analyzer are located in two different vacuum chambers.

4. The mass spectrometric system according to claim 3, wherein the pressure in the vacuum chamber of the first RF funnel is higher than the pressure in the vacuum chamber of the ion mobility analyzer.

5. The mass spectrometric system according to claim 1, wherein the ion mobility analyzer is a TIMS analyzer.

6. The mass spectrometric system according to claim 5, further comprising an additional TIMS analyzer which is located between the first RF funnel and the RF multipole or the RF tunnel and collinearly arranged to the first RF funnel.

7. The mass spectrometric system according to claim 6, further comprising an ion gate between both TIMS analyzers.

8. The mass spectrometric system according to claim 6, wherein the TIMS analyzer and/or the additional TIMS analyzer comprise an accumulation region for trapping and a mobility separation region.

9. The mass spectrometric system according to claim 6, wherein the first RF funnel and the additional TIMS analyzer are located in a first vacuum chamber and the TIMS analyzer is located in a second vacuum chamber.

10. The mass spectrometric system according to claim 9, wherein the pressure in the first vacuum chamber is higher than the pressure in the second vacuum chamber.

11. The mass spectrometric system according to claim 9, wherein the RF multipole or the RF ion tunnel is completely located in the first chamber or the second chamber or transitions from the first into the second chamber.

12. The mass spectrometric system according to claim 9, wherein the RF multipole or the RF ion tunnel is located in an additional vacuum chamber which is located between the first and second chambers and separated from these chambers by differential pumping stages.

13. The mass spectrometric system according to claim 12, wherein the pressure in the additional vacuum chamber is lower than the pressure in the first and second vacuum chambers.

14. The mass spectrometric system according to claim 1, wherein the RF multipole is one of an RF quadrupole, an RF hexapole, and an RF octopole.

15. The mass spectrometric system according to claim 14, wherein the RF multipole is operated as one of a quadrupole mass filter, a mass-mobility quadrupole filter, an ion guide, a fragmentation cell, an activation cell and an ion trap.

16. The mass spectrometric system according to claim 14, further comprising a light source for generating light and optics for introducing the light into the RF multipole or the RF tunnel at the exit side of the RF multipole or the RF funnel.

17. The mass spectrometric system according to claim 1, wherein the mass analyzer is one of a time-of-flight analyzer, an electrostatic ion trap, an RF ion trap, an ion cyclotron frequency ion trap and a quadrupole mass filter.

18. The mass spectrometric system according to claim 1, further comprising a mass filter and/or a fragmentation cell between the ion mobility analyzer and the mass analyzer.

19. The mass spectrometric system according to claim 1, wherein the ion source is an atmospheric pressure ion source which is coupled to a vacuum chamber of the first RF funnel by a transfer capillary.

20. The mass spectrometric system according to claim 19, wherein ions are generated using one of electrospray ionization (ESI), thermal spray ionization, matrix-assisted laser/desorption ionization (MALDI), secondary ionization, chemical ionization (CI), photo-ionization (PI), electron impact ionization (EI), and gas-discharge ionization.

21. The mass spectrometric system according to claim 1, wherein the ion source is a sub-ambient ion source which is located either upstream of the first RF funnel and inside a vacuum chamber of the first RF funnel or between the first RF funnel and the ion mobility analyzer and inside a vacuum chamber of the ion mobility analyzer.

22. The mass spectrometric system according to claim 21, wherein ions are generated using one of electrospray ionization (ESI), thermal spray ionization, matrix-assisted laser/desorption ionization (MALDI), secondary ionization, chemical ionization (CI), photo-ionization (PI), electron impact ionization (EI), and gas-discharge ionization.

23. The mass spectrometric system according to claim 1, wherein the RF multipole is segmented.

24. The mass spectrometric system according to claim 1, further comprising electrodes at the front and back end of the RF multipole.

25. The mass spectrometric system according to claim 1, further comprising a gas flow inside the RF multipole or the RF ion tunnel.

* * * * *